UNITED STATES PATENT OFFICE.

MAX AUGUST SIEGFRIED, OF LEIPSIC, GERMANY, ASSIGNOR TO THE CHEMISCHE FABRIK VON HEYDEN, ACTIEN-GESELLSCHAFT, OF RADEBEUL, GERMANY.

PROCESS OF PRODUCING PEPTONE.

SPECIFICATION forming part of Letters Patent No. 673,092, dated April 30, 1901.

Application filed September 5, 1900. Serial No. 29,049. (Specimens.)

*To all whom it may concern:*

Be it known that I, MAX AUGUST SIEGFRIED, professor, a subject of the King of Saxony, and a resident of Lindenstrasse 1, Leipsic, Kingdom of Saxony, German Empire, have invented a new and useful Improvement in the Method of Producing Peptone, of which the following is a specification.

For the production of pure peptone it is necessary that other decomposition products of albumen, the albumoses and products of decomposition of the peptone, such as leucine, should be removed from the crude solutions containing the peptone. The removal of the albumoses is not completely effected by salting out with ammonia sulfate, zinc sulfate, &c., in neutral alkaline and acid solutions, as hitherto practiced. Now this difficulty is overcome by my invention, according to which I add concentrated sulfuric acid or a saturated solution of an albumose-precipitating salt, such as ammonia sulfate or zinc sulfate and concentrated sulfuric acid, to the filtrate containing peptone in a solution saturated with such a salt obtained by the hitherto-known methods. I add sulfuric acid so long as any cloudiness occurs on long standing of the solution, or, according to my invention, at first only the greater proportion of the albumoses may be precipitated by addition of concentrated sulfuric acid, a saturated solution of such an albumose-precipitating salt, insufficient for the complete precipitation of the albumoses, being in this case added and the remainder of the albumoses being removed by the addition of a ferric salt in strongly-acid solution. The albumose-free filtrate obtained as above described is neutralized down until it possesses a feebly-acid reaction and a ferric salt, for example. Iron-ammonia alum is then added thereto. The resulting iron precipitate is filtered off and washed with the saturated solution of the salt—for example, ammonia sulfate—used before for precipitating the albumoses. The peptone-iron salt obtained is treated with lime or its equivalent (baryta) after it has been preferably stirred in water with addition of ammonia or sulfuric acid. The lime or baryta is separated from the filtrate by means of substances which will precipitate lime or baryta—for example, sulfuric or carbonic acid. The solution is then evaporated down at a low temperature, best *in vacuo*, or concentrated to a syrup and precipitated by alcohol, either direct or after acidification, with acetic acid, for example. From the filtrate from the peptone-iron precipitate a further quantity of peptone-iron precipitate is obtained by further addition of iron salt and neutralizing down of the acid, for example, with ammonia, the fresh precipitate thus obtained being further worked up in the same way as the first, or the acid is at once neutralized down in the production of the first iron precipitate, a better yield being thus obtained than would be obtained without total neutralization.

Example I. Five hundred grams albumen are digested in three liters 0.3 per cent. soda solution, with addition of a commercial trypsin preparation. The solution is saturated with ammonia sulfate by adding this salt in the solid state and is then filtered. Concentrated sulfuric acid and saturated ammonia-sulfate solution are then added to the filtrate until no cloudiness occurs, even after standing some hours. It is not possible to mention the precise quantity of the concentrated sulfuric acid to be added, as it depends on the quantity of the albumoses and other secondary substances present in the mixture to be treated. At all events the sulfuric acid is not only added up to neutralization, but in a very considerable excess. Sulfuric acid is added to the already strongly-acid liquid in such quantity that no further turbidity takes place. In the filtered liquid, after this has been neutralized down with ammonia to a point at which it still gives a distinct acid reaction, eighty grams iron-ammonia alum are dissolved while stirring, the resulting iron precipitate is filtered off, washed with saturated solution of ammonia sulfate, and stirred in water with the addition of some ammonia. The iron and sulfuric acid are separated by barium hydrate, the solution filtered, and the excess baryta in the filtrate is precipitated by carbonic acid. The filtrate from the barium carbonate is evaporated *in vacuo*, the residue is dissolved in dilute acetic acid, and precipitated by alcohol. Into the filtrate obtained from the iron precipitate, as above described, a further five hundred grams of iron-ammonia alum are stirred and the acid is totally neutralized down by gradual addition of ammonia. The resulting peptone-iron precipitate is further treated just the same as the first.

Example II. Five hundred grams albumen are digested in three liters 0.3 per cent. soda solution with addition of a commercial trypsin preparation. The solution is saturated with ammonia sulfate by adding this salt in the solid state and is then filtered. Concentrated sulfuric acid is added to the filtrate until cloudiness no longer appears, even after standing some hours. To the filtrate, to which some ammonia has been added, but which is still strongly acid, are added eighty grams iron-ammonia alum and the whole is stirred. Into the filtrate from the resulting precipitate are stirred five hundred grams of iron-ammonia alum, and the acid is neutralized down by gradual addition of ammonia. The resulting iron precipitate is worked up, as in Example I, to peptone.

It is obvious that the method or process hereinbefore described is not limited to a process including the preparation of the crude peptone solution itself, as described in the above example. Peptone solution from any desired source may be subjected to the process. It will be further understood that the examples above given are merely typical of the invention and that this is not restricted to the exact particulars and details therein described, which may be varied.

The peptone thus obtained is a white powder which is non-deliquescent, free from ash, and free from albumoses and other products of digestive action. It is not bitter, but possesses an agreeable taste. It has the pronounced character of an acid and forms metallic salts.

I claim—

1. The method or process of producing peptone, consisting in saturating a crude peptone solution with an albumose-precipitating salt, precipitating the rest of albumose from the filtered solution by means of sulfuric acid and a concentrated solution of such a salt, filtering off the resulting solution, neutralizing the filtrate, precipitating a peptone-iron compound therefrom by means of a ferric salt, freeing the peptone from said precipitate by means of an earthy alkali, precipitating the earthy alkali from the resulting solution by a suitable agent and finally evaporating the solution at a low temperature, substantially as described.

2. The method or process of producing peptone, consisting in saturating a crude peptone solution with an albumose-precipitating salt, mixing the resulting solution with concentrated sulfuric acid and a ferric salt, filtering off the resulting solution, neutralizing the filtrate, precipitating a peptone-iron compound by means of a ferric salt, freeing the peptone from said precipitate by means of an earthy alkali, precipitating the earthy alkali from the resulting solution by a suitable agent and finally evaporating the solution at a low temperature, substantially as described.

In testimony that I claim the foregoing as my invention I have signed my name, in presence of two witnesses, this 21st day of August, 1900.

MAX AUGUST SIEGFRIED.

Witnesses:
PAUL WILHELM SIEGFRIED,
FRITZ KÜHNS.